(12) United States Patent
Bhogal et al.

(10) Patent No.: US 8,521,768 B2
(45) Date of Patent: Aug. 27, 2013

(54) DATA STORAGE AND MANAGEMENT SYSTEM

(75) Inventors: Kulvir S. Bhogal, Pflugerville, TX (US);
Nitin Gaur, Round Rock, TX (US);
Chris D. Johnson, Rochester, MN (US);
Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/005,831

(22) Filed: Jan. 13, 2011

(65) Prior Publication Data

US 2012/0185500 A1 Jul. 19, 2012

(51) Int. Cl.
*G06F 7/00* (2006.01)
*G06F 17/30* (2006.01)

(52) U.S. Cl.
USPC ............ 707/769; 707/661; 718/105; 709/224

(58) Field of Classification Search
USPC .......... 707/661, 679, 769; 718/105; 709/224
See application file for complete search history.

(56) References Cited

U.S. PATENT DOCUMENTS

| | | | |
|---|---|---|---|
| 7,010,617 B2 | 3/2006 | Kampe et al. | |
| 7,447,940 B2 | 11/2008 | Peddada | |
| 7,668,806 B2 * | 2/2010 | Liu et al. | 707/769 |
| 7,757,236 B1 * | 7/2010 | Singh | 718/105 |
| 2005/0060391 A1 * | 3/2005 | Kaminsky et al. | 709/220 |
| 2006/0168084 A1 * | 7/2006 | Kogan et al. | 709/207 |
| 2009/0125732 A1 * | 5/2009 | Oya et al. | 713/300 |
| 2009/0147702 A1 * | 6/2009 | Buddhikot et al. | 370/255 |
| 2009/0172142 A1 * | 7/2009 | Hanai et al. | 709/223 |
| 2009/0249279 A1 | 10/2009 | Bourdon | |
| 2010/0017460 A1 * | 1/2010 | Shen et al. | 709/203 |
| 2010/0174939 A1 * | 7/2010 | Vexler | 714/5 |
| 2011/0019623 A1 * | 1/2011 | Funabiki et al. | 370/328 |

* cited by examiner

*Primary Examiner* — Cam Truong
(74) *Attorney, Agent, or Firm* — Fox Rothschild, LLP; Robert J. Sacco

(57) ABSTRACT

Methods (600-900) for optimizing performance of systems (100, 200). The methods involve determining if a device (108, $108_1$, $108_2$, ..., $108_N$) has been deployed as a standalone device or a cluster device. The determination can be based on a value of a flag stored in the device (e.g., an appliance) or contents of device registration information stored in a master device of a cluster of devices. The methods also involve automatically delegating data management operations to a centralized Memory Management System (MMS) or a distributed MMS (210) based on results of said determination. The centralized MMS (110) performs relational database management operations (e.g., SQL operations) in response to said data management operations being delegated thereto. The distributed MMS performs grid database management operations (e.g., non-SQL based operations or key-value based operations) in response to said data management operations being delegated thereto.

16 Claims, 9 Drawing Sheets

DATA STORAGE AND MANAGEMENT SYSTEM

BACKGROUND OF THE INVENTION

1. Statement of the Technical Field

The inventive arrangements relate to Data Storage and Management (DSM) systems, and more particularly to systems and methods for optimizing performance of the DSM systems by selectively delegating data management operations to an in-memory database system or an in-memory data grid system based on whether or not a device (e.g., an appliance) is a standalone device or a cluster device.

2. Description of the Related Art

There are a variety of DSM systems known in the art. Exemplary DSM systems are appliance based systems. The term "appliance", as used herein, refers to a server or other computing device having software pre-packed thereon for providing services (e.g., user registry services, login services and data management services) to service users. An appliance typically includes, but is not limited to, In-Memory DataBase Systems (IMDBSs) and/or In-Memory Data Grid Systems (IMDGSs). IMDBSs and IMDGSs are well known to those having ordinary skill in the art, and therefore will not be described in detail herein. However, a brief discussion of IMDBSs and IMDGSs is provided below to assist a reader in understanding the current state of the art.

Each of the IMDBSs comprises a centralized Memory Management System (MMS) and a centralized memory. In this IMDBS scenario, a single appliance performs Relational Database Management (RDM) operations for managing configuration data (e.g., login information) stored in the centralized memory. The RDM operations generally involve reading data from the centralized memory, writing (or inserting) data into the centralized memory, updating data stored in the centralized memory and deleting data stored in the centralized memory. The read, write (or insert), update and delete operations are often achieved using Structured Query Language (SQL) elements. For example, if a service user wants to obtain a list of houses which have a sales price greater than one hundred thousand dollars ($100,000.00), then an SQL query is generated to retrieve said list. An exemplary SQL query is defined by the following statements.

SELECT *
   FROM House
   WHERE price >100,000.00
   ORDER by Address

The SQL query retrieves all rows from a "House Table" in which the "price" column contains a value greater than one hundred thousand dollars ($100,000.00). The result is presented in ascending order by address.

In contrast, each of the IMDGSs comprises a distributed MMS and a distributed memory. In this IMDGS scenario, a cluster of appliances performs Grid Database Management (GDM) operations for managing configuration data (e.g., login information) stored in the distributed memory. More particularly, each appliance of the cluster is responsible for the management of their own configuration data (e.g., login information) stored in a grid memory. The GDM operations generally involve reading data from the distributed memory, writing data into the distributed memory, updating data stored in the distributed memory and deleting data stored in the distributed memory. The GDM operations are generally achieved using non-SQL element, such as key-value elements. For example, if a service user wants to obtain particular data, then look-up operations are performed by the IMDGS to identify a key associated with said data. The data is searched for in the distributed memory by specifying said key. As a result of the search, value information associated with said key is retrieved from an object map.

Despite the advantages of the above described appliance based systems, they suffer from certain drawbacks. For example, appliances often utilize the same configuration data ("common configuration data") during operation. This common configuration data is stored in primary and secondary grid memories of each appliance. As such, a plurality of redundant copies of the common configuration data is contained in the IMDG of an appliance based system. One can appreciate that this configuration data redundancy is undesirable since primary and second grid memory space of the IMDG is wasted. Furthermore, the above described appliance based systems do not comprise a means for automatically detecting and tracking a change in the runtime environment or the operating state (e.g., a standalone operating state or a cluster operating state) of an appliance. Consequently, data management operations of an IMDBS or an IMDGS must be manually enabled or disabled each time an appliance is added to or removed from a cluster of appliances.

SUMMARY OF THE INVENTION

Embodiments of the present invention concern implementing systems and methods for optimizing performance of systems. The methods generally involve determining if a device (e.g., an appliance) has been deployed as a standalone device or a cluster device. The determination is made in response to receiving a request from a network node (e.g., a server). The request can include, but is not limited to, a data read request, a data write or insert request, a data update request or a data delete request. The determination can be made based on a value of a flag stored in the device or contents of device registration information stored in a master device of a cluster of devices.

The methods also involve automatically delegating data management operations to a centralized Memory Management System (MMS) of the device if it is determined that the device has been deployed as a standalone device. The centralized MMS performs relational database management operations in response to the data management operations being delegated thereto. The relational database management operations can include, but are not limited to, SQL based operations.

The methods further involve automatically delegating the data management operations to a distributed MMS of the device if it is determined that the device has been deployed as a cluster device. The distributed MMS performs grid database management operations in response to the data management operations being delegated thereto. The grid database management operations can include, but are not limited to, non-structured query language based operations (e.g., key-value based operations).

BRIEF DESCRIPTION OF THE DRAWINGS

Embodiments will be described with reference to the following drawing figures, in which like numerals represent like items throughout the figures, and in which.

DETAILED DESCRIPTION

Figure 1:
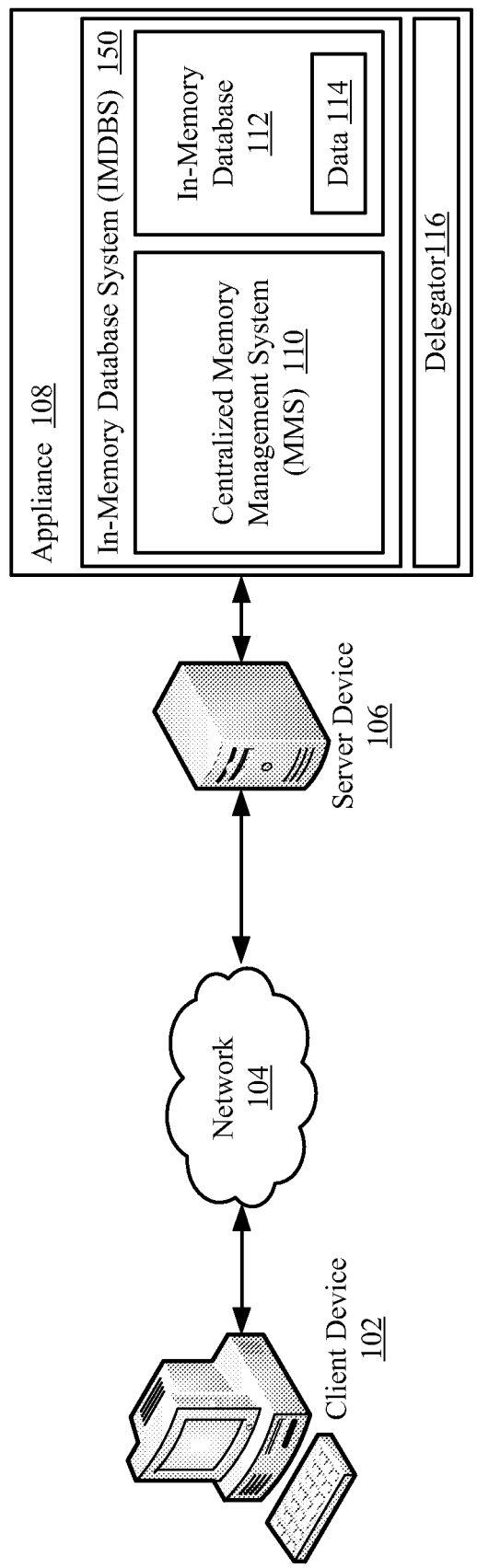
FIG. 1 is a conceptual diagram of a first exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention generally concerns implementing systems and methods for optimizing performance of DSM systems. The performance optimization is at least partially achieved by selectively delegating data management operations to a centralized MMS or a distributed MMS based on whether or not a device (e.g., an appliance) is a standalone device or a cluster device. If the device (e.g., an appliance) is a standalone device, then data management operations are automatically and selectively delegated to a centralized MMS of an In-Memory DataBase System (IMDBS). In response to said delegation, RDM operations (e.g., SQL operations) are performed by the IMDBS. The RDM operations will be described in detail below. If the device (e.g., an appliance) is a cluster device, then the data management operations are automatically and selectively delegated to a distributed MMS of an In-Memory Data Grid System (IMDGS). In response to said delegation, GDM operations (e.g., non-SQL database management operation or key-value based operations) are performed by the IMDGS. The GDM operations will be described in detail below.

The present invention overcomes various drawbacks of conventional DMS systems. For example, the present invention advantageously provides a means for automatically and selectively delegating data management operations to: an IMDBS if it is determined that a device is a standalone device (i.e., a device that has been deployed as a standalone device or a device that has been removed from a cluster of devices); or an IMDGS if it is determined that a device is a cluster device (i.e., a device that has been added to a cluster of appliances). The automatic and selective delegations are at least partially facilitated by an ability of the present invention to automatically detect and track changes in the runtime environment or the operating state (e.g., a standalone operating state or a cluster operating state) of a device. Notably, the present invention also provides a means for eliminating or reducing the amount of configuration data redundancy in the DMS system as compared to that of conventional DSM systems, such as those disclosed above in the background section of this document.

The present invention can be used in a variety of applications. Such applications include, but are not limited to, appliance based applications, server based applications, and/or any other application in which one or more devices may be added to or removed from a cluster of devices. Exemplary implementing systems will be described in relation to FIGS. 1-5. Exemplary method embodiments of the present invention will be described below in relation to FIGS. 6-9.

Exemplary Communication System Implementing the Present Invention

Referring now to FIG. 1, there is provided a block diagram of an exemplary system 100 which implements the present invention. The system 100 is generally configured to provide various services to users. The services include, but are not limited to, user registry services, login services and data management services. Accordingly, the system 100 includes at least one client device 102, a network 104, at least one server device 106 and at least one appliance 108 which has been deployed as a standalone device. Methods of deploying appliances as standalone devices are well known to persons having ordinary skill in the art, and therefore will not be described herein. Any such method of deploying appliances can be used with the present invention without limitation. Each of the components 102, 104, 106 are also well known to persons having ordinary skill in the art, and therefore will not be described in detail herein. However, a brief discussion of the components 102, 104, 106 will be provided to assist the reader in understanding the present invention.

The client device 102 is configured to facilitate the provision of the above-identified services to a user thereof. As such, the client device 102 includes a computing device having a browser installed thereon. Browsers are well known to person's having ordinary skill in the art, and therefore will not be described in detail herein. Still, it should be understood that the browser is a software application for retrieving, presenting and traversing information resources on the network 104. The information resources include, but are not limited to, web pages, images and other content (e.g., lists, tables, graphs and data).

The network 104 allows for communications between the client device 102 and the server device 106. As such, the network 104 can include, but is not limited to, servers (not shown), gateways (not shown), routers (not shown) and other devices to which each of the communication devices 102, 106 can connect via wired or wireless communication links. The communication links can be trusted communication links in which secure software (e.g., cryptographic software) and/or secure hardware (e.g., tamper proof hardware) is employed.

The server 106 is configured to control access to data stored in the appliance 108. As such, the server 106 includes a computing device capable of: receiving a service request (e.g., a login request) from the client device 102; generating a request for reading data (e.g., login data) 114 from a memory of the appliance 108, writing data 114 into said memory, updating data stored in said memory or deleting data stored in said memory; and communicating the generated request to the appliance 108. If the request is a read request, then the sever 106 will receive data 114 read from the memory of the appliance 108, forward the received data 114 to the client device 102, and/or perform operations (e.g., authentication operations) using the received data 114.

In response to receiving a request from the server device 106, the appliance 108 performs delegation operations. The delegation operations are implemented by a delegator 116 of the appliance 108. The delegator 116 can be implemented in hardware, software or a combination thereof. The delegation operations generally involve: accessing information that can be used to determine if the appliance 108 is a standalone device; determining if the appliance 108 is a standalone device based on said information; and delegating data management operations for handling said request to a centralized MMS 110 if it is determined that the appliance 108 is a standalone device.

Figure 4:
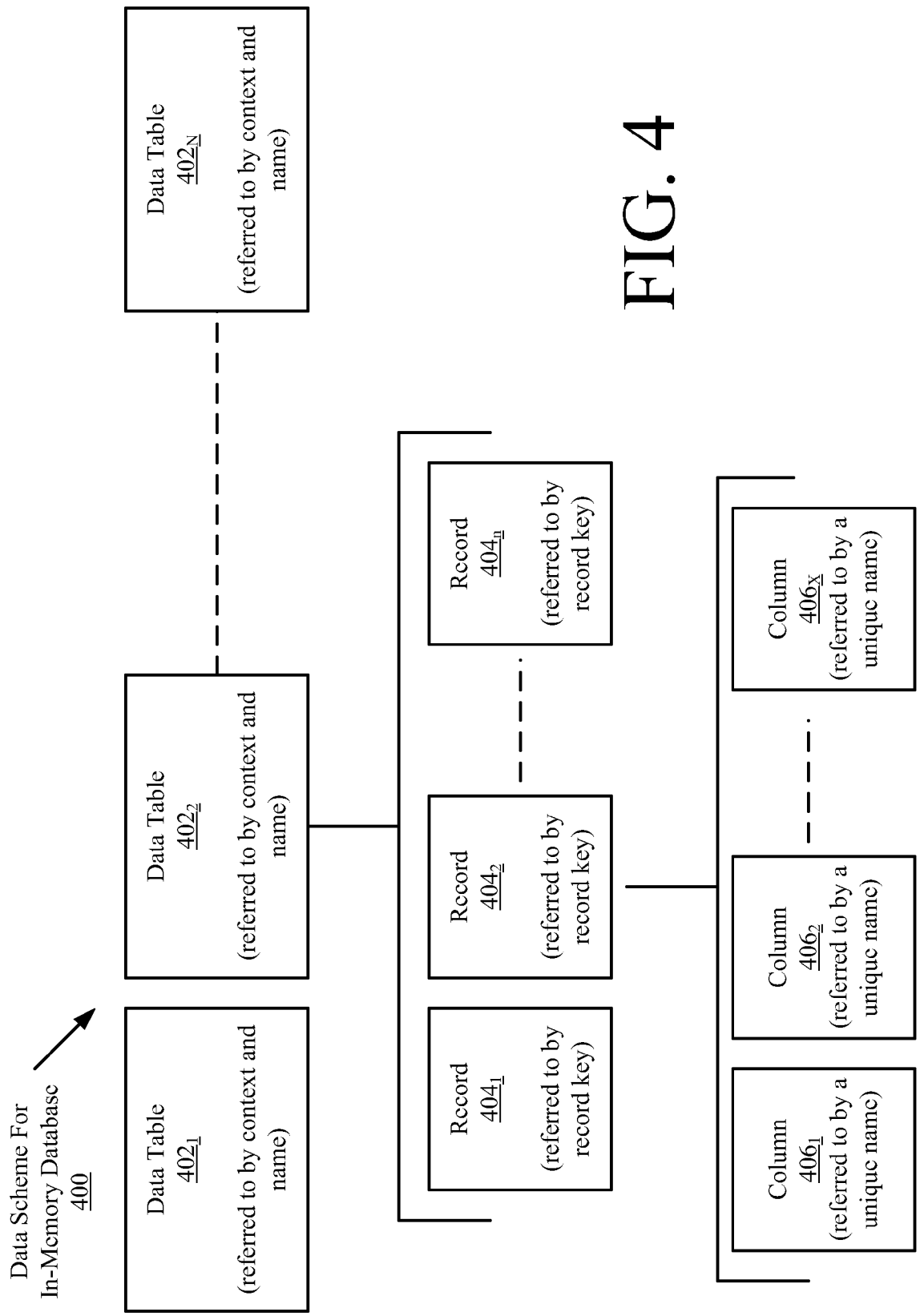
FIG. 4 is a schematic illustration of an exemplary data scheme for an in-memory database that is useful for understanding the present invention.

According to embodiments of the present invention, the data management operations are RDM operations, such as SQL operations. In this scenario, data 114 is organized in the in-memory database 112 according to a relational database scheme. Relational database schemes are well known to persons having ordinary skill in the art, and therefore will not be described in detail herein. However, a schematic illustration of an exemplary relational database scheme 400 is provided in FIG. 4 for purposes of assisting a reader in understanding the present invention. As shown in FIG. 4, data is organized as a set of data tables $402_1, 402_2, \ldots, 402_N$. Each data table $402_1, 402_2, \ldots, 402_N$ has a context and a name assigned thereto so that it can be searched for by specifying said context and name. Each data table $402_1, 402_2, \ldots, 402_N$ includes a plurality of records $404_1, 404_2, \ldots, 404_N$. Each record $404_1, 404_2, \ldots, 404_N$ has a record key assigned thereto so that it can be searched for by specifying said record key. Each record $404_1, 404_2, \ldots, 404_N$ includes a plurality of columns $406_1, 406_2, \ldots, 406_N$. Each column $406_1, 406_2, \ldots, 406_N$ has a unique name (e.g., a string of characters) assigned thereto so that it can be searched for by specifying said unique name. In this scenario, the relational database management operations are performed to read data from and/or write (or insert) data into the in-memory database 112 according to the relational database scheme 400. The database management operations can also be performed to update and/or delete data stored in the in-memory database 112. Accordingly, the database management operations include, but are not limited to, data insert operations, data query operations, data update operations and data delete operations. Embodiments of the present invention are not limited in this regard.

Figure 2:
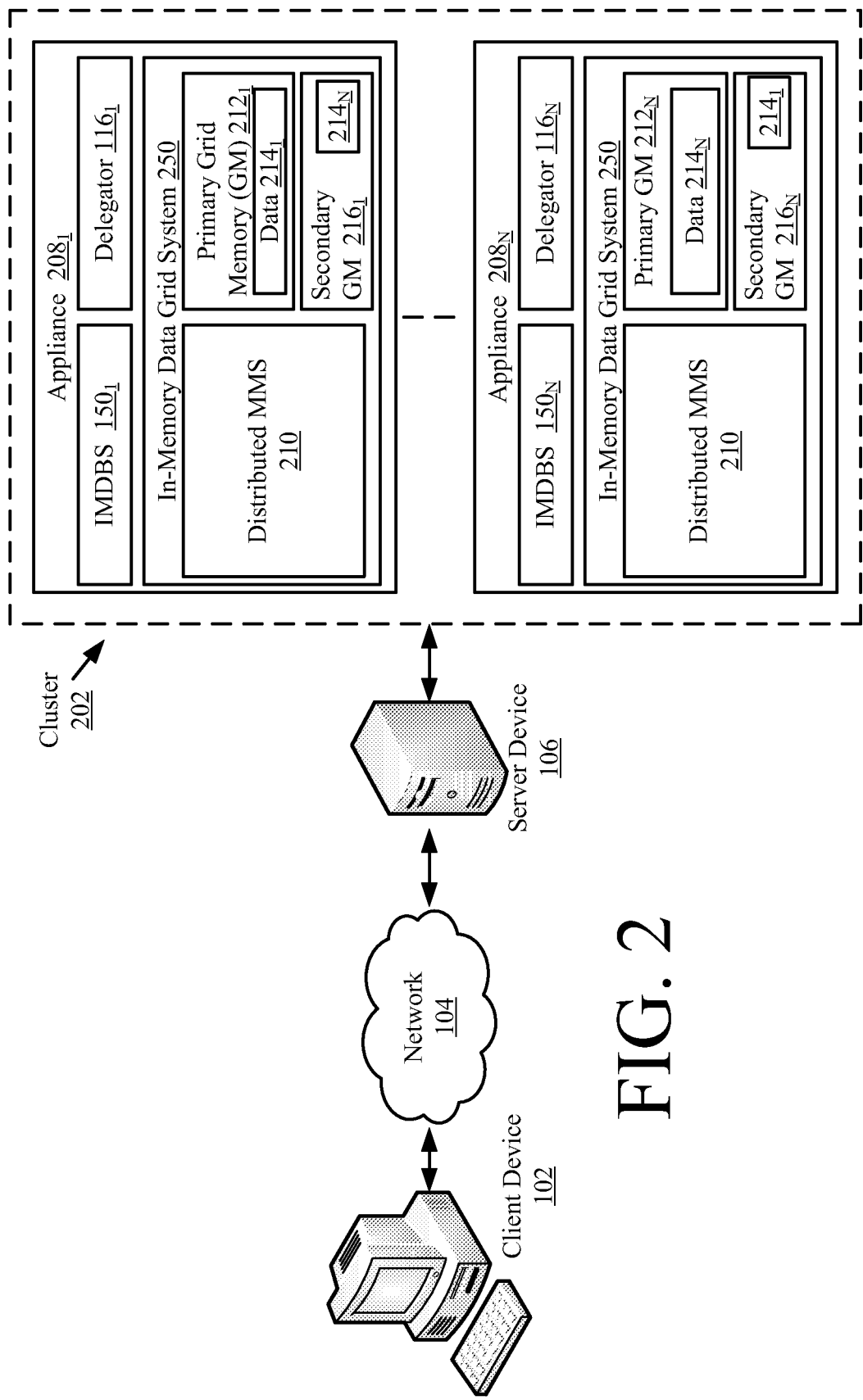
FIG. 2 is a block diagram of a second exemplary system that is useful for understanding the present invention.

Referring now to FIG. 2, there is provided a schematic illustration of a second exemplary system 200 which implements the present invention. The system 200 is generally configured to provide various services to one or more service users. The services include, but are not limited to, user registry services, login services and data management services. Accordingly, the system 200 includes at least one client device 102, a network 104, at least one server device 106 and a plurality of appliances $208_1, 208_2, \ldots, 208_N$ which have been deployed as a cluster 202 of devices. Methods for deploying devices as a cluster of devices are well known to those having ordinary skill in the art. Any such method of deploying device as a cluster of devices can be used with the present invention without limitation. An exemplary method 600 for adding a device to a cluster of devices will be described below in relation to FIG. 6. Each of the components 102, 104, 106 is the same as those described above in relation to FIG. 1, and therefore will not be described here in relation to FIG. 2.

As shown in FIG. 2, each of the appliances $208_1, 208_2, \ldots, 208_N$ includes an IMDBS $150_1, 105_2, \ldots, 150_N$, a delegator $116_1, 116_2, \ldots, 116_N$ and at least a portion of an IMDGS 250. Each of the IMDBSs $150_1, 105_2, \ldots, 150_N$ is the same as or similar to the IMDBS 150 of FIG. 1. As such, the above provided discussion of the IMDBS 150 is sufficient for understanding the IMDBS $150_1, 105_2, \ldots, 150_N$ of FIG. 2. Similarly, each of the delegators $116_1, 116_2, \ldots, 116_N$ is the same as or similar to the delegator 116 of FIG. 1. As such, the above provided discussion of the delegator 116 is sufficient for understanding the delegators $116_1, 116_2, \ldots, 116_N$ of FIG. 2. However, additional delegation operations of the delegators $116_1, 116_2, \ldots, 116_N$ are described below in relation to the operation of the cluster 202 of devices.

During operation, the client device 102 sends a service request to the server device 106. In turn, the server device 106 sends a read, write, update or delete request to the cluster 202 of devices. In response to receiving the request from the server device 106, one or more of the appliances $208_1, 208_2, \ldots, 208_N$ performs delegation operations. The delegation operations are implemented by each of the delegators $116_1, 116_2, \ldots, 116_N$ of the appliances $208_1, 208_2, \ldots, 208_N$. Each delegator $116_1, 116_2, \ldots, 116_N$ can be implemented in hardware, software or a combination thereof. The delegation operations generally involve: accessing information that can be used to determine if an appliance $208_1, 208_2, \ldots, 208_N$ is a standalone device or a cluster device; determining if the appliance $208_1, 208_2, \ldots, 208_N$ is a standalone device or cluster device based on said information; delegating data management operations for handling said request to a distributed MMS 210 of the IMDGS 250 if it is determined that the appliance $208_1, 208_2, \ldots, 208_N$ is not a standalone device or is a cluster device.

Figure 5:
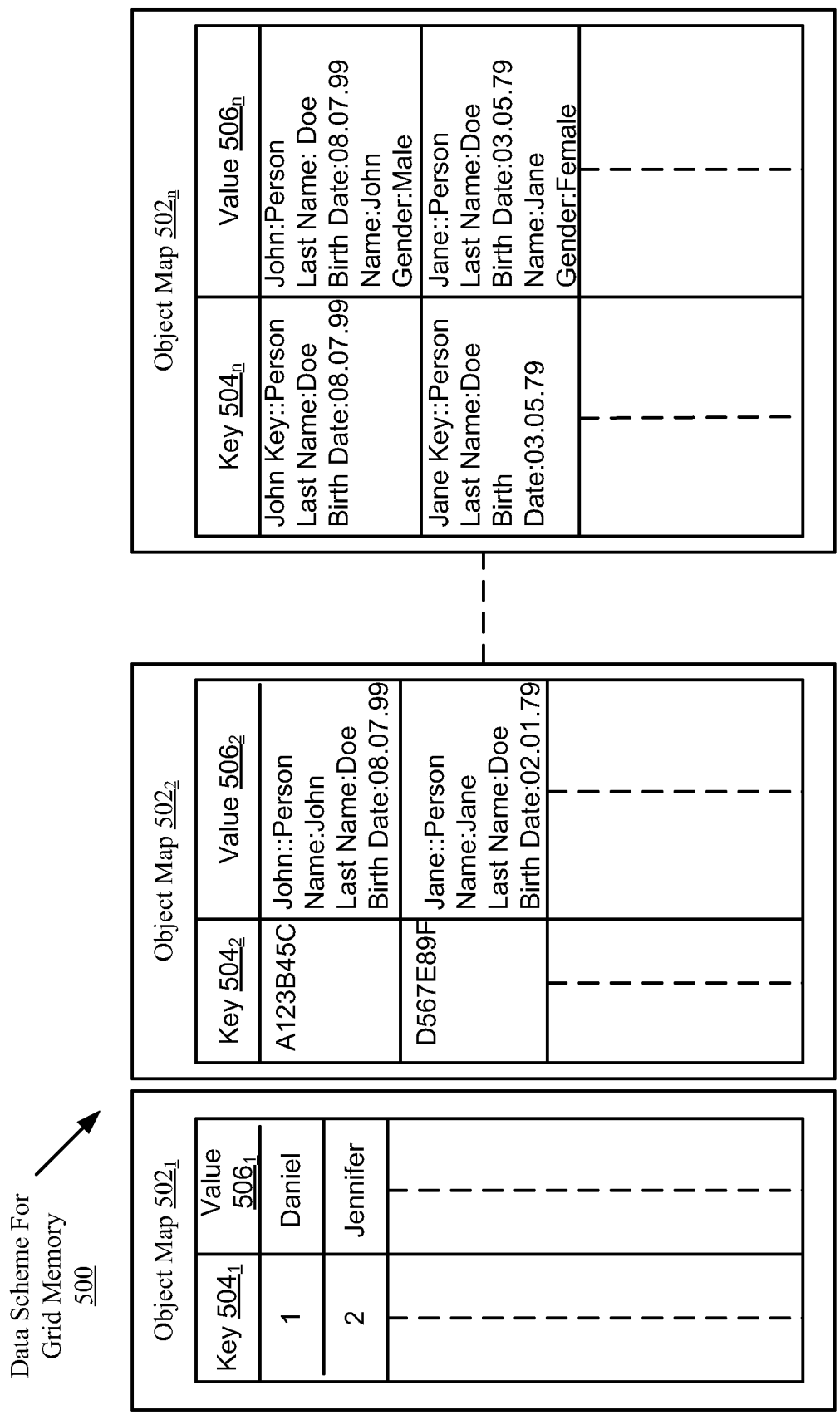
FIG. 5 is a schematic illustration of an exemplary data scheme for a grid memory that is useful for understanding the present invention.

According to embodiments of the present invention, the data management operations are non-SQL database management operations, such as key-value based operations. In this scenario, data $214_1, 214_2, \ldots, 214_N$ is organized in primary grid memories $212_1, 212_2, \ldots, 212_N$ and secondary grid memories $216_1, 216_2, \ldots, 216_N$ according to a grid memory scheme. Grid memory schemes are well known to persons having ordinary skill in the art, and therefore will not be described in detail herein. However, a schematic illustration of an exemplary grid memory scheme 500 is provided in FIG. 5 for purposes of assisting a reader in understanding the present invention. As shown in FIG. 5, data is organized as a set of object maps $502_1, 502_2, \ldots, 502_n$. Each object map $502_1, 502_2, \ldots, 502_N$ includes a plurality of keys $504_1, 504_2, \ldots, 504_n$ and a plurality of values $506_1, 506_2, \ldots, 506_n$. Each value $506_1, 506_2, \ldots, 506_n$ has a key $504_1, 504_2, \ldots, 504_n$ assigned thereto so that it can be search for by specifying said key. In this scenario, the relational database management operations are performed to read data from and/or write data into the primary grid memories $212_1, 212_2, \ldots, 212_N$ and/or secondary grid memories $216_1, 216_2, \ldots, 216_N$ according to the grid memory scheme 500. The database management operations can also be performed to update and/or delete data stored in the primary grid memories $212_1, 212_2, \ldots, 212_N$ and/or secondary grid memories $216_1, 216_2, \ldots, 216_N$. Accordingly, the database management operations include, but are not limited to, data write operations, data read operations, and delete data operations. Embodiments of the present invention are not limited in this regard.

Figure 3:
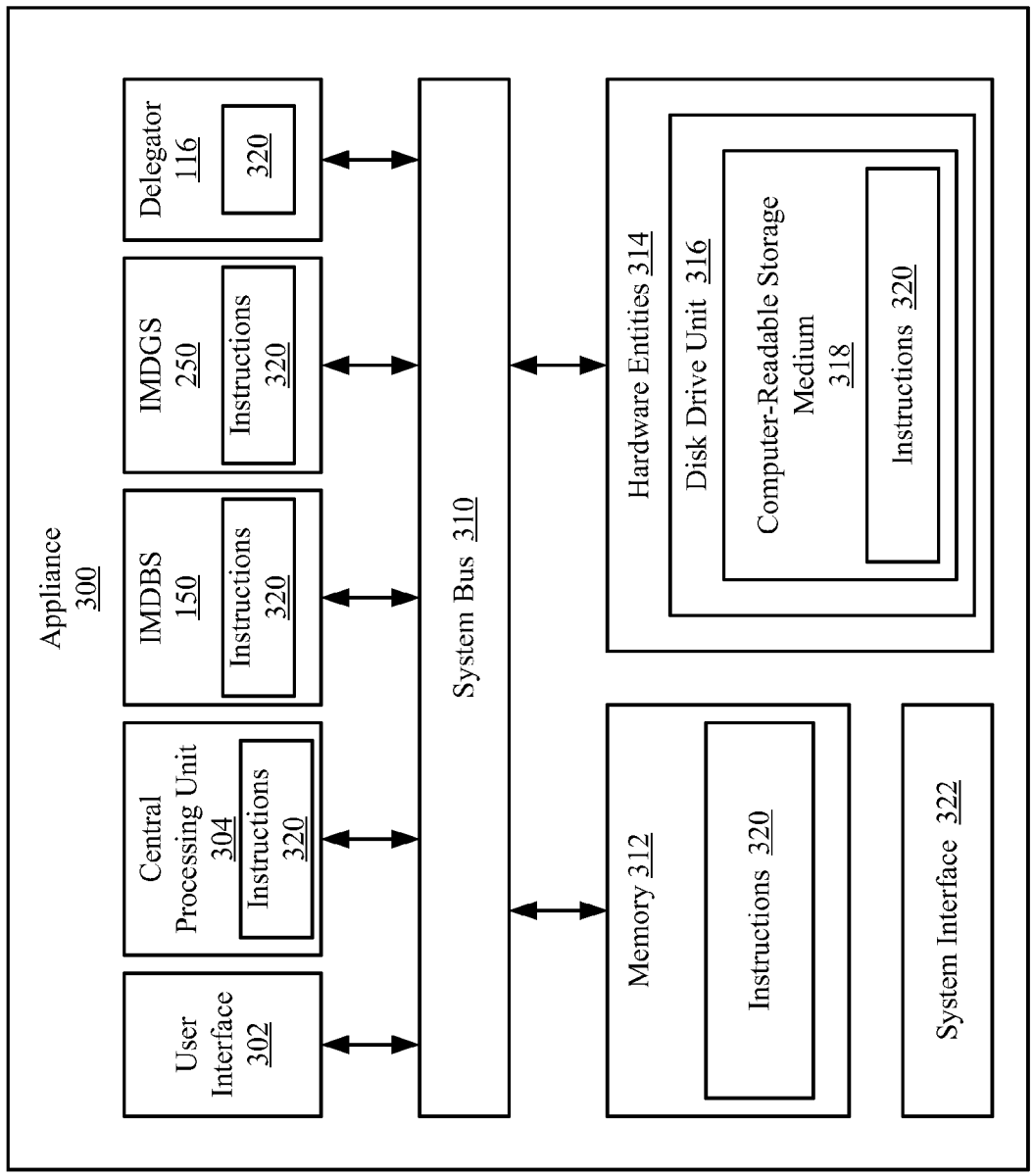
FIG. 3 is a detailed block diagram of an exemplary appliance that is useful for understanding the present invention.

Referring now to FIG. 3, there is provided a more detailed block diagram of an exemplary appliance 300 that is useful for understanding the present invention. The appliances 108, $208_1, 208_2, \ldots, 208_N$ of FIGS. 1-2 are the same as or similar to the appliance 300. As such, the following discussion of the appliance 300 is sufficient for understanding the appliances 108, $208_1, 208_2, \ldots, 208_N$ of FIGS. 1-2. Notably, the appliance 300 can include more or less components than those shown in FIG. 3. However, the components shown are sufficient to disclose an illustrative embodiment implementing the present invention. The hardware architecture of FIG. 3 represents one embodiment of a representative appliance configured for automatically: (a) tracking whether the appliance 300 has been added to or removed from a cluster of appliances; (b) eliminating or reducing redundancy of configuration data in an IMDGS when the appliance 300 is added to the cluster of appliances; and (c) selectively delegating data management operations to an IMDBS or an IMDGS based on whether or not the appliance 300 is a standalone device or a cluster device. As such, the appliance 300 implements method embodiments of the present invention. Exemplary method embodiments will be described in detail below in relation to FIGS. 6-9.

As shown in FIG. 3, the appliance 300 includes a system interface 322, a user interface 302, a Central Processing Unit (CPU) 304, a system bus 310, a memory 312 connected to and accessible by other portions of the appliance 300 through system bus 310, and hardware entities 314 connected to system bus 310. At least some of the hardware entities 314 perform actions involving access to and use of memory 312, which can be a Random Access Memory (RAM), a disk driver and/or a Compact Disc Read Only Memory (CD-ROM). System interface 322 allows the appliance 300 to communicate directly or indirectly with external communication devices (e.g., device 106 of FIGS. 1-2).

Hardware entities 314 can include microprocessors, Application Specific Integrated Circuits (ASICs) and other hardware. Hardware entities 314 can include a microprocessor programmed for facilitating the provision of services to users of a system (e.g., system 100 of FIG. 1 or system 200 of FIG. 2). The services can include, but are not limited to, user registry services, login services and data management services. In this regard, it should be understood that the microprocessor can access and run data management applications (not shown in FIG. 3) and other types of applications installed on the appliance 300. The data management applications are operative to facilitate the management of data stored in memory 312, IMDBS 150 and IMDGS 250.

As shown in FIG. 3, the hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312, the CPU 306, IMDBS 150, IMDGS 250 and/or delegator 116 during execution thereof by the appliance 300. The components 312, 306, 150, 250 and/or 116 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the appliance 300 and that cause the appliance 300 to perform any one or more of the methodologies of the present disclosure.

As evident from the above discussion, the systems 100, 200 implement one or more method embodiments of the present invention. The method embodiments of the present invention provide implementing systems 100, 200 with certain advantages over conventional data storage and management systems. For example, the present invention advantageously provides systems 100, 200 that can automatically and selectively delegate data management operations to: an IMDBS if it is determined that a device is a standalone device (i.e., a device that has been deployed as a standalone device or a device that has been removed from a cluster of devices); or an IMDGS if it is determined that a device is a cluster device (i.e., a device that has been added to a cluster of devices). The automatic and selective delegations are at least partially facilitated by an ability of the systems 100, 200 to automatically detect and track changes in the runtime environment or the operating state (e.g., a standalone operating state or a cluster operating state) of a device. Notably, the present invention also provides systems 100, 200 in which the amount of redundant configuration data in an IMDGS is reduced as compared to that of conventional DSM systems. The above listed advantages of the present invention will become more evident as the discussion progresses.

Exemplary Method Embodiments of the Present Invention

Figure 6:
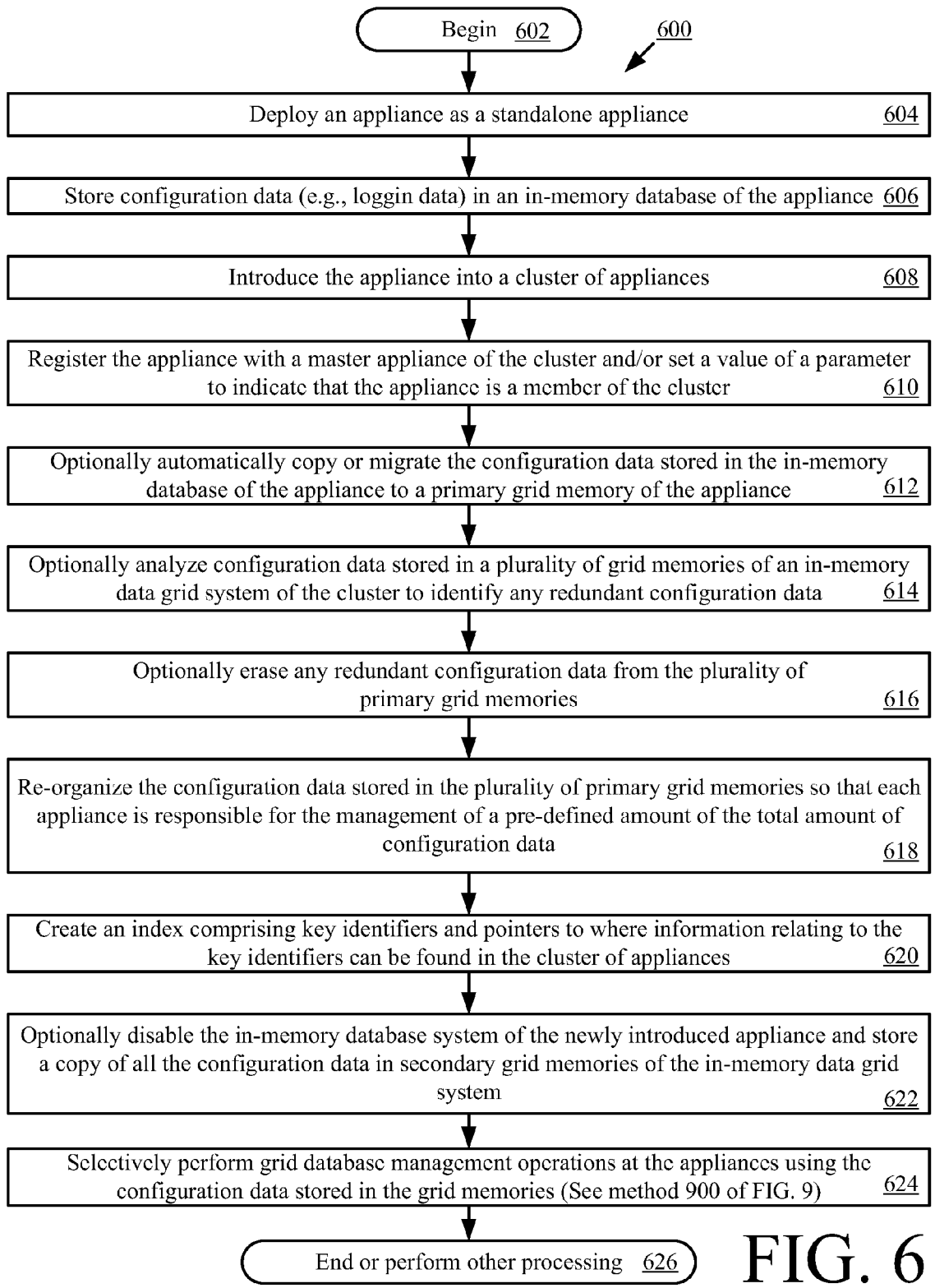
FIG. 6 is a flow diagram of an exemplary method for adding an appliance to a cluster of appliances that is useful for understanding the present invention.

Referring now to FIG. 6, there is provided an exemplary method 600 for adding an appliance (e.g., appliance 108 of FIG. 1 or appliance $108_1, 108_2, \ldots,$ or $108_N$ of FIG. 2) to a cluster of appliances (e.g., cluster 202 of FIG. 2) that is useful for understanding the present invention. As shown in FIG. 6, the method 600 begins with step 602 and continues with step 604. In step 604, an appliance is deployed as a standalone device. Methods for deploying a device as a standalone device are well known to persons having ordinary skill in the art, and therefore will not be described in detail herein. Any such method for deploying a device as a standalone device can be used with the present invention without limitation. Thereafter, in step 606, configuration data is stored in an in-memory database (e.g., in-memory database 112 of FIG. 1) of the appliance. The configuration data can include, but is not limited to, login data (e.g., user identifiers, group identifiers and passwords) and any other data required to leverage the appliance.

In a next step 608, the appliance is introduced into the cluster of appliances. Accordingly, the appliance registers with a master appliance of the cluster in step 610. Additionally or alternatively, the appliance sets a value of a parameter to indicate that the appliance is a member of the cluster. For example, a value of a flag is set to zero (0) or one (1) thereby indicating that the appliance is a member of a cluster. The term "flag", as used herein, refers to one or more bits that are used to store a binary value or code that has an assigned meaning. When the flag is set, a notification is sent to all other appliances in the cluster. The notification indicates that the appliance is activated, i.e., has been added to the cluster. Embodiments of the present invention are not limited in this regard.

In response to the addition of the appliance to the cluster, the appliance may perform one or more optional steps 612-616. Optional step 612 involves automatically copying or migrating the configuration data stored in the in-memory database to a primary grid memory (e.g., primary grid memory $212_1, 212_2, \ldots,$ or $212_N$ of FIG. 2) of the appliance. Step 612 can be performed in scenarios where two or more groups of users are merged into one group such that different sets of configuration data are combined into a single set of configuration data within an IMDGS (e.g., IMDGS 250 of FIG. 2) of the cluster.

Upon completing optional step 612, the method 600 continues with optional steps 614 and 616. Optional steps 614 and 616 are performed for purposes of eliminating or reducing the amount of data redundancy in the IMDGS of the cluster. Accordingly, step 614 involves analyzing at least a portion of the configuration data stored in a plurality of primary grid memories of the IMDGS of the cluster to identify any redundant configuration data. If redundant configuration data is identified in step 614, then the redundant data is erased from the primary grid memories, as shown by step 616.

In a next step 618, the configuration data stored in the primary grid memories are re-organized so that each appliance of the cluster is responsible for the management of a pre-defined amount of the total amount of the configuration data. For example, if the cluster comprises four (4) appliances, then each of the appliances is responsible for the management of twenty-five percent (25%) of the total amount of configuration data. Embodiments of the present invention are not limited in this regard. The appliances of the cluster can be responsible for the same or different amount of configuration data.

After the configuration data has been re-organized, step 620 is performed where an index is created. The index comprises key identifiers and pointers to where information relating to the key identifiers can be found in the cluster of appliances. Subsequent to the completion of step 620, the IMDBS of the newly introduced appliance is optionally disabled, as shown by step 622. Step 622 can also involve storing a copy of all of the re-organized configuration data in secondary grid memories of the IMDGS of the cluster.

In a next step 624, the appliances of the cluster selectively perform grid database management operations using the configuration data stored in the primary grid memory and/or secondary grid memories. An exemplary method for selectively performing grid database management operations will be described below in relation to FIG. 9. Upon completing step 624, the method 600 ends or other processing is performed, as shown by step 626.

Figure 7:
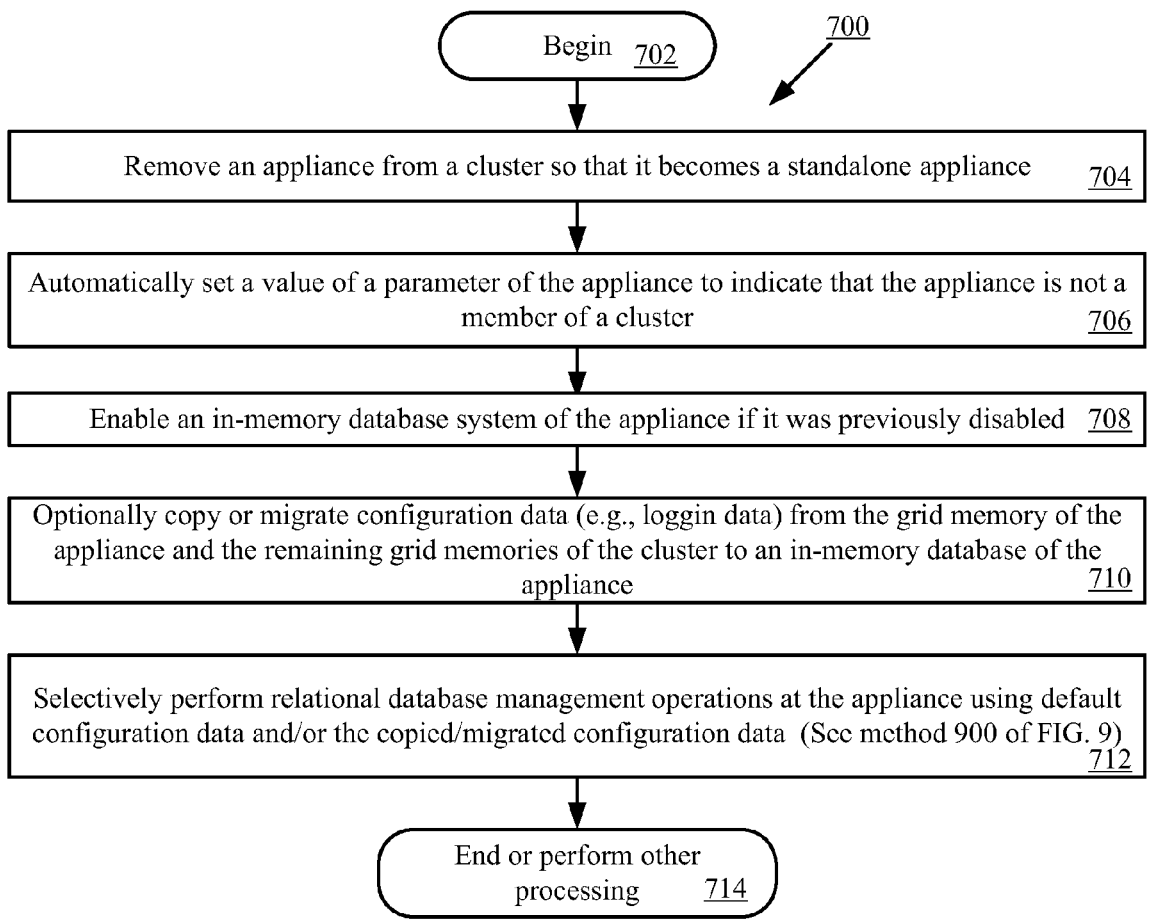
FIG. 7 is a flow diagram of a first exemplary method for removing an appliance from a cluster of appliances that is useful for understanding the present invention.

Referring now to FIG. 7, there is provided a flow diagram of a first exemplary method 700 for removing an appliance (e.g., appliance 108 of FIG. 1 or appliance $108_1$, $108_2$, ..., or $108_N$ of FIG. 2) from a cluster of appliances (e.g., cluster 202 of FIG. 2) that is useful for understanding the present invention. Notably, the method 700 illustrates operations performed by the appliance which is removed from the cluster. An exemplary method 800 illustrating operations performed by the appliances which are not removed from the cluster is described below in relation to FIG. 8.

As shown in FIG. 7, the method 700 begins with step 702 and continues with step 704. In step 704, the appliance is removed from the cluster of appliances so that it becomes a standalone appliance. In response to the removal of the appliance from the cluster, step 706 is performed where a value of a parameter of the appliance is automatically set to indicate that the appliance is not a member of the cluster. For example, a value of a flag is set to zero (0) or one (1) thereby indicating that the appliance is not a member of a cluster. In response to setting the flag, a notification can optionally be sent to the cluster of appliances. The notification can indicate that the appliance is disabled, i.e., has been removed from the cluster. Embodiments of the present invention are not limited in this regard.

In a next step 708, an IMDBS (e.g., IMDBS 150 of FIG. 1 or IMDBS $150_1$, $150_2$, ..., or $150_N$ of FIG. 2) of the appliance is optionally enabled. Step 708 is performed when the operations of the IMDBS was previously disabled, for example during step 622 of FIG. 6.

As a consequence of the removal of the appliance from the cluster, configuration data is optionally automatically copied or migrated from the grid memory (e.g., grid memory $212_1$, $212_2$, ..., $212_N$, $216_1$, $216_2$, ..., or $216_N$ of FIG. 2) of the appliance and/or the remaining grid memories of the cluster to an in-memory database (e.g., in-memory database 112 of FIG. 1) of the appliance, as shown by step 710. Thereafter, step 712 is performed where the appliance selectively performs relational database management operations using default configuration data and/or the copied/migrated configuration data. An exemplary method for selectively performing relational database management operations will be described below in relation to FIG. 9. Upon completing step 712, the method 700 ends or other processing is performed, as shown by step 714.

Figure 8:
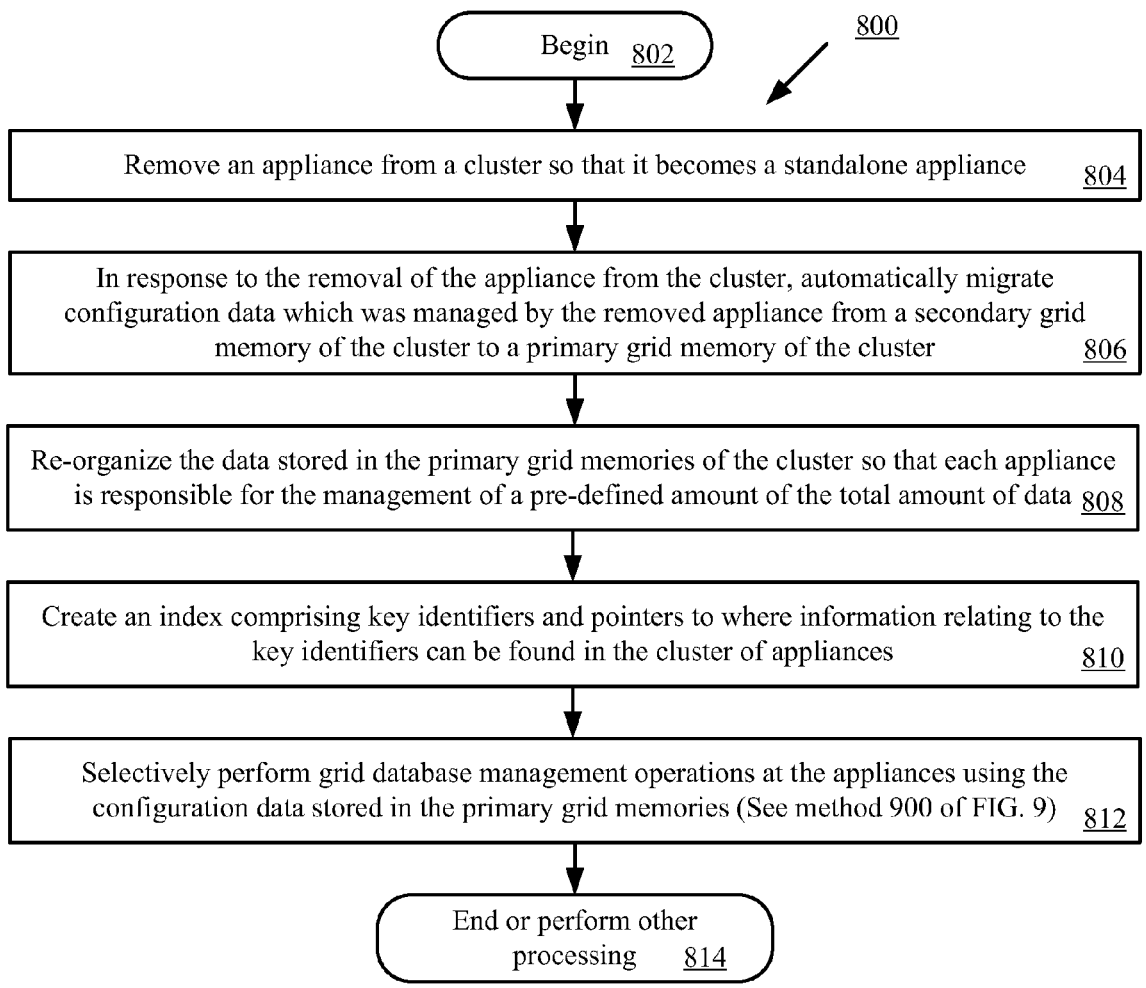
FIG. 8 is a flow diagram of a second exemplary method for removing an appliance from a cluster of appliances that is useful for understanding the present invention.

Referring now to FIG. 8, there is provided a flow diagram of a second exemplary method 800 for removing an appliance (e.g., appliance 108 of FIG. 1 or appliance $108_1$, $108_2$, ..., or $108_N$ of FIG. 2) from a cluster of appliances (e.g., cluster 202 of FIG. 2) that is useful for understanding the present invention. As shown in FIG. 8, the method 800 begins with step 802 and continues with step 804. In step 804, the appliance is removed from the cluster so that it becomes a standalone device. In response to the removal of the appliance from the cluster, step 806 is performed where configuration data is automatically migrated from one or more secondary grid memories (e.g., secondary grid memories $216_1$, $216_2$, ..., $216_N$ of FIG. 2) of the cluster to a primary grid memory (e.g., primary grid memory $212_1$, $212_2$, ..., or $212_N$ of FIG. 2) of the cluster. The configuration data includes, but is not limited to, configuration data which was managed by the removed appliance.

Subsequent to completing step 806, step 808 is performed where configuration data stored in the primary grid memories (e.g., primary grid memory $212_1$, $212_2$, ..., $212_N$ of FIG. 2) of the cluster is re-organized. The data is re-organized so that each appliance of the cluster is responsible for the management of a pre-defined amount of the total amount of data. For example, if the cluster includes five (5) appliances that are each responsible for managing twenty percent (20%) of the configuration data and one (1) appliance is removed from the cluster, then the configuration data is re-organized so that each of the remaining four (4) appliances is responsible for the management of twenty-five percent (25%) of the configuration data. Embodiments of the present invention are not limited in this regard. The appliances can be responsible for managing the same or different amount of configuration data.

After the data has been re-organized, step 810 is performed where an index is created. The index comprises key identifiers and pointers to where information relating to the key identifiers can be found in the cluster of appliances. Thereafter, step 812 is performed where the appliances of the cluster selectively perform grid database management operations using the configuration data stored in the primary grid memory and/or the secondary grid memories. An exemplary method for selectively performing grid database management operations will be described below in relation to FIG. 9. Upon completing step 812, the method 800 ends or other processing is performed, as shown by step 814.

Figure 9:
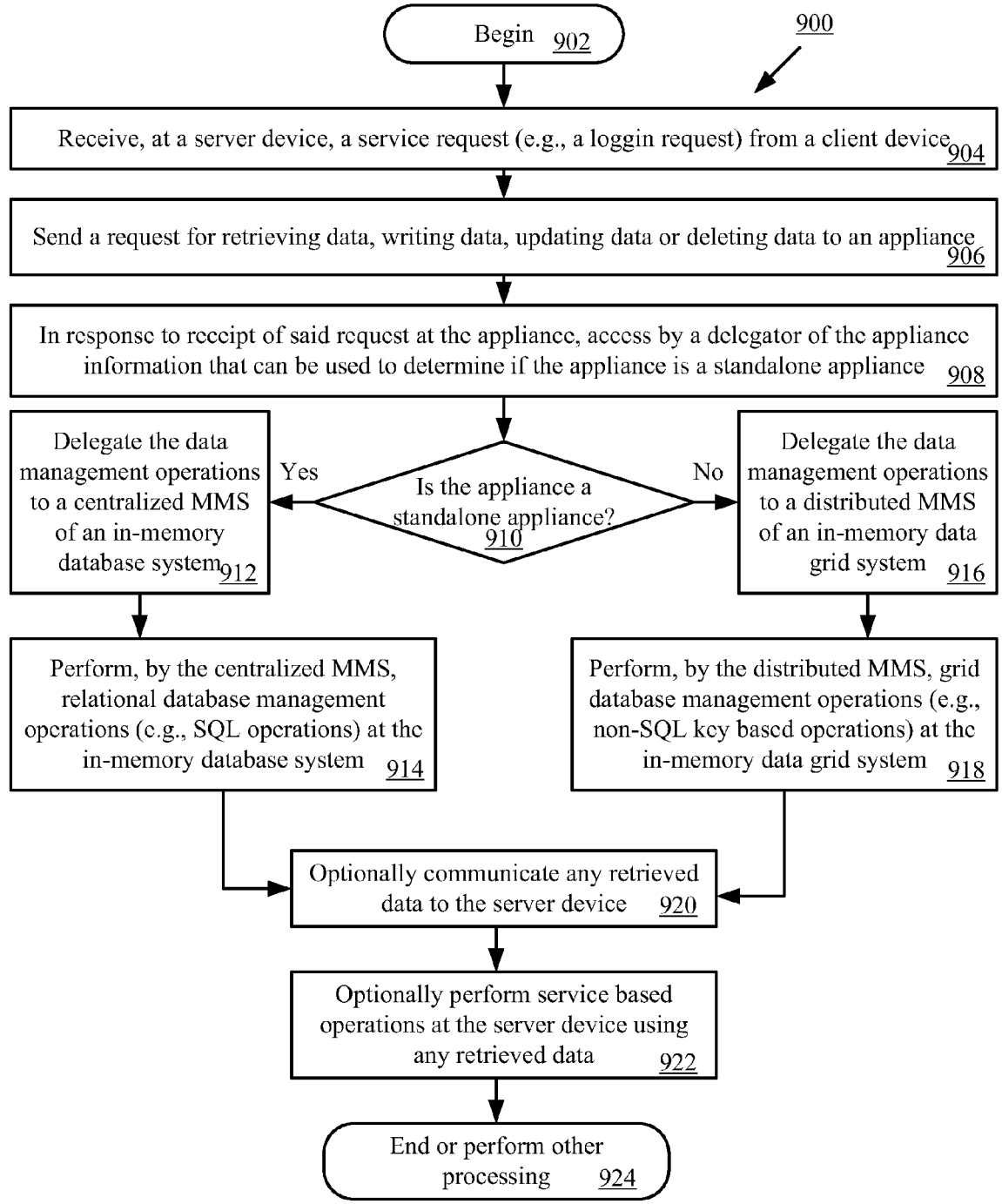
FIG. 9 is a flow diagram of an exemplary method for selectively delegating data management operations to a centralized memory management system or a distributed management system that is useful for understanding the present invention.

Referring now to FIG. 9, there is provided a flow diagram of an exemplary method 900 for selectively delegating data management operations to a centralized MMS (e.g., centralized MMS 110 of FIG. 1) or a distributed MMS (e.g., distributed MMS 210 of FIG. 2) that is useful for understanding the present invention. As shown in FIG. 9, the method 900 begins with step 902 and continues with step 904. In step 904, a service request (e.g., a login request) is received at a server device (e.g., server device 106 of FIGS. 1-2). In response to the reception of the service request, step 906 is performed where the server device generates a request for retrieving data from a storage device, writing data to a storage device, updating data stored in the storage device or deleting data stored in the storage device. The request is then communicated from the server device to one or more appliances (e.g., appliance 108 of FIG. 1 and/or appliances $208_1, 208_2, \ldots, 208_N$ of FIG. 2).

In response to the reception of the request at an appliance, a delegator (e.g., delegator 116 of FIG. 1 or delegator $116_1, 116_2, \ldots, 116_N$ of FIG. 2) of the appliance accesses information that can be used to determine if the appliance is a standalone appliance. If it is determined that the appliance is a standalone device [910:YES], then step 912 is performed. Step 912 involves delegating data management operations to the centralized MMS of an IMDBS of the appliance. In a next step 914, relational database management operations (e.g., SQL operations) are performed by the centralized MMS. The relational database management operations can involve, but are not limited to, retrieving data (e.g., login data) from an in-memory database (e.g., in-memory database 112 of FIG. 1) of the appliance, writing data into the in-memory database, updating data stored in the in-memory database and/or deleting data stored in the in-memory database. In the data retrieval scenario, the retrieved data is communicated to the server device, as shown by optional step 920. At the server device, service operations (e.g., authentication operations) are performed using the retrieved data, as shown by optional step 922. Upon completing step 922, the method 900 ends or other processing is performed as shown by step 924.

If it is determined that the appliance is not a standalone device [910:NO], then step 916 is performed. Step 916 involves delegating data management operations to a distributed MMS of an IMDGS of a cluster of appliances. In a next step 918, grid database management operations are performed by the distributed MMS. The grid database management operations can involve, but are not limited to, retrieving data (e.g., login data) from a grid memory (e.g., grid memory $212_1, 212_2, \ldots, 212_N, 216_1, 216_2, \ldots, 216_N$ of FIG. 6) of the appliance, writing data into the grid memory, updating data stored in the grid memory and/or deleting data stored in the grid memory. In the data retrieval scenario, the retrieved data is communicated to the server device, as shown by optional step 920. At the server device, service operations (e.g., authentication operations) are performed using the retrieved data, as shown by optional step 922. Upon completing step 922, the method 900 ends or other processing is performed as shown by step 924.

In light of the forgoing description of the invention, it should be recognized that the present invention can be realized in hardware, software, or a combination of hardware and software. A method for matching gain levels of transducers according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for optimizing performance of systems, comprising:
performing operations by a device to automatically detect and track changes in an operating state thereof;
automatically determining, by at least one electronic circuit of said device at any given time, if said operating state is currently a standalone operating state or a cluster operating state based on a value of a flag stored in said device or contents of device registration information stored in a master device of a cluster of devices, where said standalone operating state occurs when said device is deployed as a standalone device and said cluster operating state occurs when said device is deployed as a cluster device;
automatically delegating, by said electronic circuit, data management operations for handling incoming requests to a centralized Memory Management System (MMS) of said device if a determination is made that said operating state is currently a standalone operating state; and
automatically delegating, by said electronic circuit, said data management operations for handling incoming requests to a distributed MMS of said device if a determination is made that said operating state is currently a cluster operating state;

wherein said incoming requests comprise at least one of a request for reading data from a memory, writing data into said memory, updating data stored in said memory, and deleting data stored in said memory.

2. The method according to claim 1, further comprising performing relational database management operations by said centralized MMS in response to said data management operations being delegated thereto.

3. The method according to claim 2, wherein the relational database management operations are achieved using a structured query language.

4. The method according to claim 1, further comprising performing grid database management operations by said distributed MMS in response to said data management operations being delegated thereto.

5. The method according to claim 4, wherein said grid database management operations comprise non-structured query language based operations.

6. The method according to claim 1, further comprising:
receiving, by said electronic circuit, a request from a network device, said request being selected from the group consisting of a data read request, a data write or insert request, a data update request and a data delete request; and
in response to receiving said request, determining if said device has been deployed as a standalone device or a cluster device.

7. A system comprising:
at least one electronic circuit comprising a memory having stored thereon instructions, which when executed by said electronic circuit, cause said electronic circuit to perform the following operations comprising:
automatically detecting and tracking changes in an operating state of a device;
automatically determining, at any given time, if said operating state of said device is currently a standalone operating state or a cluster operating state based on a value of a flag stored in said device or contents of device registration information stored in a master device of a cluster of devices, where said standalone operating state occurs when said device is deployed as a standalone device and said cluster operating state occurs when said device is deployed as a cluster device;
automatically delegating data management operations for handling incoming requests to a centralized Memory Management System (MMS) of said device exclusively if a determination is made that said operating state is currently a standalone operating state; and
automatically delegating said data management operations for handling said incoming requests to a distributed MMS of said device if a determination is made that said operating state is currently a cluster operating state;
wherein said incoming requests comprise at least one of a request for reading data from a memory, writing data into said memory, updating data stored in said memory, and deleting data stored in said memory.

8. The system according to claim 7, wherein said centralized MMS performs relational database management operations in response to said data management operations being delegated thereto.

9. The system according to claim 8, wherein the relational database management operations comprise structured query language based operations.

10. The system according to claim 7, wherein said distributed MMS performs grid database management operations in response to said data management operations being delegated thereto.

11. The system according to claim 10, wherein said grid database management operations comprise non-structured query language based operations.

12. The system according to claim 7, wherein said electronic circuit is further caused to:
receive a request from a network device, said request being selected from the group consisting of a data read request, a data write or insert request, a data update request and a data delete request; and
in response to receiving said request, determine if said device has been deployed as a standalone device or a cluster device.

13. A non-transitory machine-readable storage medium having instructions stored thereon, which when executed by a machine, cause the machine to perform the following operations comprising:
automatically detecting and tracking changes in an operating state of said machine; automatically determining, at any given time, if said operating state is currently a standalone operating state or a cluster operating state based on a value of a flag stored in said machine or contents of machine registration information stored in a master machine of a cluster of machines, where said standalone operating state occurs when said machine is deployed as a standalone machine and said cluster operating state exists when said machine is deployed as a cluster machine;
automatically delegating data management operations for incoming requests to a centralized Memory Management System (MMS) of said machine if a determination is made that said operating state is currently a standalone operating state; and
automatically delegating said data management operations for handing said incoming requests to a distributed MMS of said machine if a determination is made that said operating state is currently a cluster operating state;
wherein said incoming requests comprise at least one of a request for reading data from a memory, writing data into said memory, updating data stored in said memory, and deleting data stored in said memory.

14. The machine-readable storage medium according to claim 13, wherein said machine is further caused to perform relational database management operations in response to said data management operations being delegated to said centralized MMS.

15. The machine-readable storage medium according to claim 13, wherein said machine is further caused to perform grid database management operations in response to said data management operations being delegated to said distributed MMS.

16. The machine-readable storage medium according to claim 13, wherein said machine is further caused to:
receive a request from a network device, said request being selected from the group consisting of a data read request, a data write or insert request, a data update request and a data delete request; and
in response to receiving said request, determine if said machine has been deployed as a standalone machine or a cluster machine.

* * * * *